United States Patent
Lee et al.

(10) Patent No.: US 8,181,224 B2
(45) Date of Patent: May 15, 2012

(54) METHOD FOR RECOGNIZING INFORMATION FLOW AND DETECTING INFORMATION LEAKAGE BY ANALYZING USER'S BEHAVIORS

(75) Inventors: Cheolho Lee, Daejeon (KR); Kiwook Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1112 days.

(21) Appl. No.: 12/039,930

(22) Filed: Feb. 29, 2008

(65) Prior Publication Data

US 2008/0320556 A1    Dec. 25, 2008

(30) Foreign Application Priority Data

Jun. 19, 2007   (KR) ................ 10-2007-0059904

(51) Int. Cl.
*G06F 7/04* (2006.01)
(52) U.S. Cl. ............................. 726/2; 726/25
(58) Field of Classification Search ............ 726/2, 22
See application file for complete search history.

(56) References Cited

U.S. PATENT DOCUMENTS

| | | | |
|---|---|---|---|
| 7,337,155 B2* | 2/2008 | Yoshida | 706/15 |
| 7,870,612 B2* | 1/2011 | Liu | 726/24 |
| 7,945,958 B2* | 5/2011 | Amarasinghe et al. | 726/25 |
| 2005/0091532 A1 | 4/2005 | Moghe | |
| 2006/0206941 A1* | 9/2006 | Collins | 726/25 |

OTHER PUBLICATIONS

Xuxian Jiang et al. "Provenance-Aware Tracing of Worm Break-in and Comtaminations: A Process Coloring Approach." *icdcs*, p. 38, 26th IEEE International Conference on Distributed Computing Systems (ICDCS'06), 2006.

* cited by examiner

*Primary Examiner* — Amare F Tabor
(74) *Attorney, Agent, or Firm* — Ladas & Parry LLP (57) ABSTRACT

A method for analyzing user's behaviors is provided. API function call patterns occurring when operations on various objects are performed on a computer system are configured with contexts. User's behaviors are recognized as associations between the contexts and systematically expressed. Information flow occurring in the user's behaviors (i.e., associations between the contexts) is tracked. The information flow chain is divided into a source and a destination. When the information flow a confidential object to a leakage point occurs, the information leakage is rapidly detected and blocked. By exactly recognizing behaviors belonging to the corresponding information flow chain, user's behaviors related to the information leakage can be detected. Furthermore, the behavior expression based on the contexts configured with the API function call patterns with respect to the system object can be achieved by naturally connecting the API function call occurring on the system as an abstract behavior.

20 Claims, 5 Drawing Sheets

METHOD FOR RECOGNIZING INFORMATION FLOW AND DETECTING INFORMATION LEAKAGE BY ANALYZING USER'S BEHAVIORS

BACKGROUND OF THE INVENTION

1. Field of the Invention

The present invention relates to a method for recognizing information flow and detecting information leakage by analyzing user's behaviors, and more particularly, to a method for recognizing information flow and detecting information leakage by analyzing user's behaviors, in which user's behaviors are monitored in view of information flow and systematically represented, and behavior analysis is performed to determine whether information leakage is generated from user's behaviors.

2. Description of the Related Art

As one of information flow related technologies, Dorothy E. Denning proposed a lattice model which guarantees secure information flow in 1976. The lattice model suggests a mathematical model for secure information flow when information flow is generated by access to an object having a predetermined security level. The lattice model is widely used in a variety of information security fields, for example, an access control. Such a model is a model for guaranteeing the secure information flow (that is, the flowing of information in an intended direction) and merely mathematically defines problems such as information leakage that information does not flow in an intended direction, but it has a limitation in suggesting systematic solutions.

In 2006, Xuxian Jiang et al proposed a process coloring approach, which is a behavior analysis method based on the lattice model. The process coloring approach assigns different colors to processor (or services) providing remote services and diffuses the colors with respect to resources accessed by a specific processor. When such a color diffusion model is applied to information leakage protection, a specific color is assigned to an object to be protected, and a corresponding color is diffused according to the access of the processes. When the color is diffused to a location where information leakage is possible, it is detected as the information leakage. However, since this method is focused on detecting and protecting the information leakage, it has a limitation in systematically representing user's behaviors.

Furthermore, commercial solutions for information leakage protection are designed to control unauthorized storage medium, or encrypt a file in order to prevent information from being written through a leakage point of USB, IEEE1394 port, or the like. Furthermore, when an attempt to leak out a file is detected, it is determined if the corresponding file is a confidential document that should be protected. In this case, since a moving path of the corresponding file is not detected exactly, information leakage may not be effectively detected when complicated and various information flows occur.

SUMMARY OF THE INVENTION

Accordingly, the present invention is directed to a method for recognizing information flows and detecting information leakage by analyzing user's behaviors, which substantially obviates one or more problems due to limitations and disadvantages of the related art.

It is an object of the present invention to provide a method for recognizing information flows and detecting information leakage by analyzing user's behaviors, which recognizes information flow occurring in an access to a system object, systematically represents user's behaviors causing the information flow, and detects the information leakage.

It is another object of the present invention to provide a method for recognizing information flow and detecting information leakage by analyzing user's behaviors, which can be applied to behavior analysis, such as user's behavior pattern analysis or malicious code analysis, by recognizing information flow occurring in an access to a system object.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for recognizing information flow and detecting information leakage, the method including the steps of: recognizing operations running on an operating system as contexts defined as a set of object handle, related API function list, and situation information; expressing possible associations between the contexts; explicitly expressing the expressed associations between the contexts as user's behaviors occurring on a system; determining if a target object with respect to a behavior is used as a function of a source object of another behavior in the explicitly expressed associations between the contexts; and recognizing the behavior as one behavior corresponding to a dynamically extended context association when the target object is used as the function of the source object of another behavior.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Hereinafter, a method for recognizing information flow and detecting information leakage by analyzing user's behaviors will be described in detail with reference to the accompanying drawings.

Figure 1:
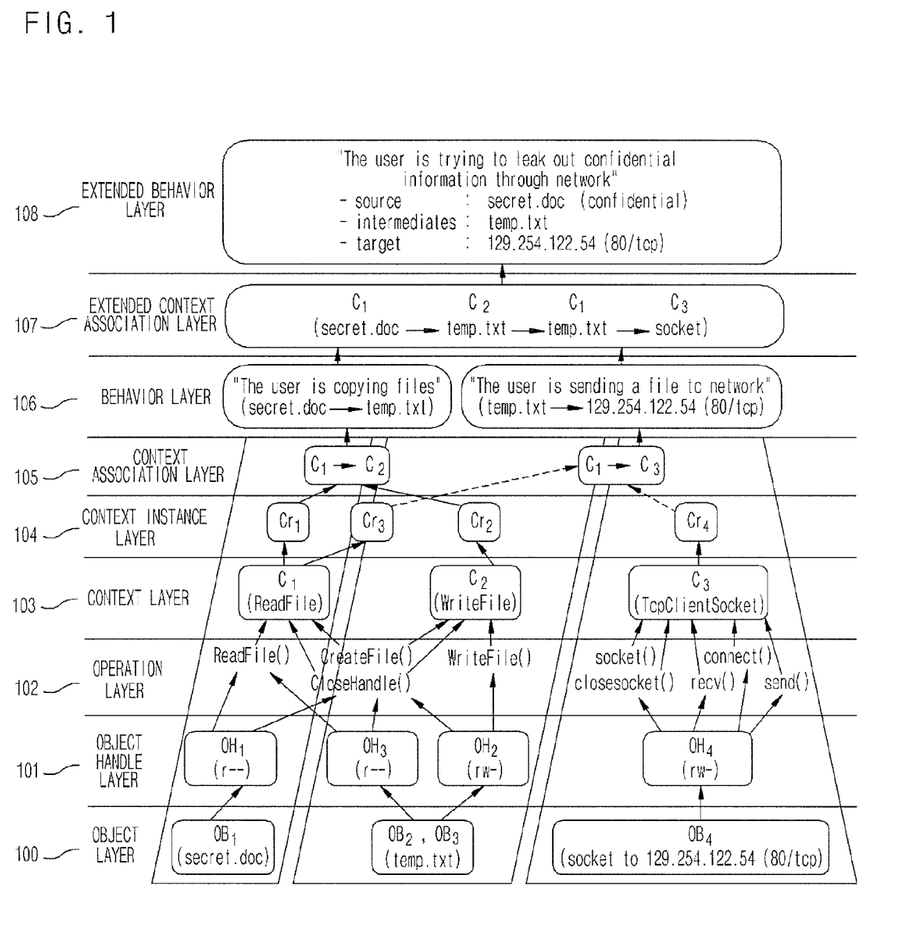
FIG. 1 is a block diagram of an entire hierarchy structure showing a context-based behavior representation method according to an embodiment of the present invention.

FIG. 1 is a block diagram of an entire hierarchy structure showing a context-based behavior representation method according to an embodiment of the present invention.

Referring to FIG. 1, the method of the present invention has two technical meanings: a behavior modeling method for systematically representing user's behaviors occurring on a computer system, and a method for recognizing information flow occurring between the represented behaviors.

The behavior modeling method of the present invention is based on a context. Generally, the context means a degree of "information on user's current state and intention". The context is defined in a different type according to domain to which the context is applied. In the present invention, the context is defined as a set of object handle (OH), related API function list, and situation information.

It is assumed that user's behaviors are recognized as a call of API function with respect to a specific object handle in view of user's behaviors, and a related API function supported by the operating system must be used for operation on specific objects $OB_1$, $OB_2$, $OB_3$ and $OB_4$. For example, in order to read a file in an operation layer 102, a CreateFile( ) function for the corresponding file is called to obtain a handle for file object. Then, a ReadFile( ) function is called to read contents of the file. Finally, a CloseHandle( ) function is called to terminate the use of the file object handle In this way, when the user wants to read the contents of the specific file, the user's behaviors occurring on the system can be defined as the call of the CreatFile( ) function, the ReadFile( ) function, and the CloseHandle( ) function with respect to the handle of the corresponding file.

Therefore, one context $C_1$ is configured in a context layer 103, based on the behaviors (CreatFile( ), ReadFile( ), CloseHandle( )) of the user having an intention (ReadFile). Using the set of the API functions constituting the context, the functions that are not called can be predicted in the context layer 103.

As described above, the behaviors occurring in the operating system generate a handle for the specific object, and are expressed as the call of the API function with respect to the corresponding object handle. Therefore, the context layer 103 expressing each context is defined by an object layer 100, an object handle layer 101, and an operation layer 102, which are located under the context layer 103.

Since a context instance expressed in a context instance layer 104 is generated from the context defined in the context layer 103, it is identical to a concept of class and instance in an object oriented methodology.

The association between the contexts $C_1$, $C_2$ and $C_3$ is defined in a context association layer 105, and all possible associations between the contexts $C_1$, $C_2$ and $C_3$ can be expressed. The user's behaviors occurring from the contexts $C_1$, $C_2$ and $C_3$ and their association on the system can be explicitly expressed in a behavior layer 106. For example, if the fact that the information read from the context $C_1$ (ReadFile) flows to other place through the context $C_2$ (WriteFile) is recognized, it can be considered that $C_1$ and $C_2$ have a predetermined association in the information flow.

In view of the behavior layer 106, it is assumed that $C_1$ is a behavior for a document of secret.doc and $C_2$ is a behavior for a document of temp.txt. Using behavior abbreviation words of the contexts $C_1$ and $C_2$, it can be explicitly expressed that the user reads the context of the document of secret.doc ("The user is copying files from secret.doc"), and saves the file as temp.txt and sends it to the network ("The user is sending a file to network"). This means that the user's behaviors occurring in the system are monitored and automatically expressed in an abstract language the human being can understand.

Regarding the user's behaviors expressed in the behavior layer 106, if a target object of one behavior is used as a source object of other behavior, a dynamically extended context association can be generated in an extended context association layer 107. Using this, two or more behaviors can be recognized as one behavior by associating them, just like an expression in an extended behavior layer 108. In the example of the extended behavior layer 108 in FIG. 1, temp.txt serves as a linking pin of two behaviors, that is, the behavior expressed by the association of $C_1 \rightarrow C_2$ and the behavior expressed by the association of $C_1 \rightarrow C_3$, and therefore the two behaviors can be expressed as one behavior. The information expressed in the extended behavior layer 108 can be expressed by referencing to the situation information of the context.

The "association" defined in the context association layer 105 is defined centering in the association with the information flow, providing a behavior model that can recognize the information flow and detect the information leakage. If other association components as well as the information flow are sufficiently considered in defining the context association, the behavior modeling method according to the present invention can express user's behaviors over the entire system.

Figure 2:
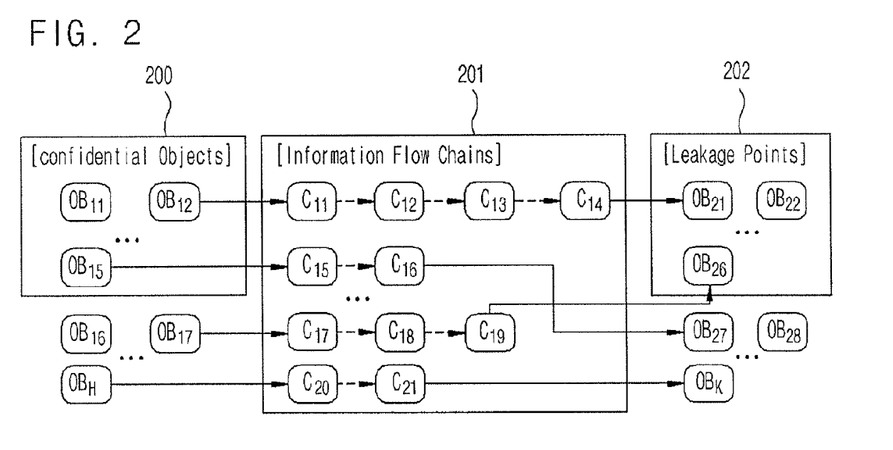
FIG. 2 is a block diagram illustrating the detection of information leakage using the behavior modeling method according to the embodiment of the present invention.

FIG. 2 is a block diagram illustrating the detection of information leakage using the behavior modeling method according to the embodiment of the present invention.

Referring to FIG. 2, the behavior modeling method according to the embodiment of the present invention expresses user's behaviors using the association between the contexts $C_{11}, C_{12}, \ldots, C_{21}$. The association between a series of the contexts $C_{11}, C_{12}, \ldots, C_{21}$ forms one information flow chain 201. The information flow chain 201 is divided into a source and a destination. When the source is a confidential object 200 and a destination is a leakage point 202, it is possible to exactly detect the situation that the confidential object 200 leaks out due to the information flow generated through the corresponding information flow chain 201. It is assumed herein that the confidential object 200 and the leakage point 202 are previously defined according to the applied domain.

In addition, the information flow chain 201 is designed to have a persistence so as to increase information flow tracking performance. All of the left objects $OB_{11}$, $OB_{12}$, $OB_{15}$, $OB_{16}$, $OB_{17}$ and $OH_H$ are source objects that contain information. The right objects are all destination objects to which information finally flows by the information flow. In the left objects, the objects $OB_{11}$, $OB_{12}$ and $OB_{15}$ included in a block 200 are confidential objects that should be protected, and the others $OB_{16}$, $OB_{17}$ and $OB_H$ are general objects that need not be protected.

In the right objects, the leakage points 202 are objects indicating possible location of the information flow. Examples of the leakage points 202 include network, USB, and so on. The others $OB_{27}$, $OB_{28}$ and $OB_K$ are destination objects that cannot be directly used in the information leakage.

The objects $OB_{27}$, $OB_{28}$ and $OB_K$ may be again associated with the information flow to thereby form a longer chain.

A block 201 represents an information flow chain 201 formed by the context that is an intermediate of the information flow. The middle contexts can have objects that are intermediates, but the middle objects are not illustrated in FIG. 2 for convenience.

The expression of the association between the contexts is concentrated on the association related to the information flow. The associations can be classified into an execution association, a convergence association, and a transfer association.

Figure 3:
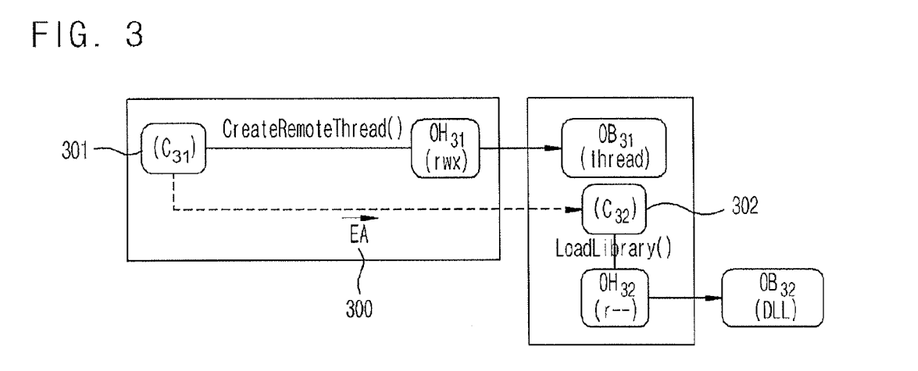
FIG. 3 is a block diagram of the execution association according to an embodiment of the present invention.

FIG. 3 is a block diagram of the execution association according to an embodiment of the present invention.

Referring to FIG. 3, a DLL injection is illustrated as an example of the execution association. The DLL injection is to generate a thread to load an arbitrary DLL file within other process area. That is, the context $C_{31}$ (CreateRemoteThread) 301 generates an arbitrary thread $OB_{31}$ within an arbitrary process through a call of a CreateRemoteThread( ) functions and obtains a handle $OH_{31}$. The context $C_{32}$ (LoadLibrary) 302 is generated by the thread $OB_{31}$, which is generated by the context $C_{31}$, and loads an arbitrary DLL file $OB_{32}$. At this point, the association between the context $C_{31}$ 301 and the context $C_{32}$ 302 is recognized as the execution association 300.

For example, when the B thread is generated from the A thread, it can be said that the context for calling CreateRemoteThread( ) and all contexts generated in the B thread have the execution association. In other words, in the method for expressing the user's behaviors, two contexts are defined as having the execution association when one executable object generated by one context generates another context in order to express the behavior related to the information flow by using a plurality of contexts and their associations.

Figure 4:
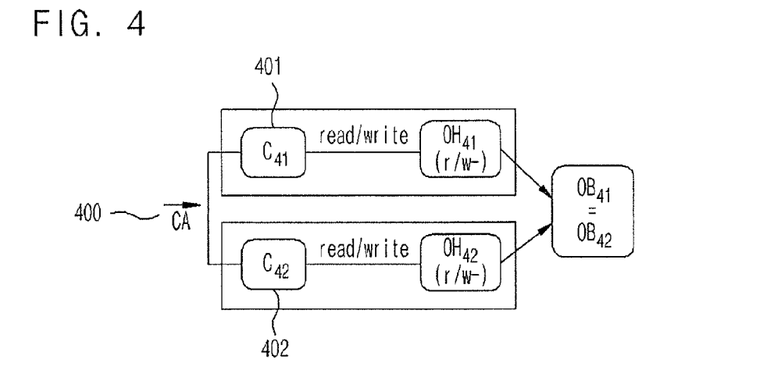
FIG. 4 is a block diagram of the convergence association according to an embodiment of the present invention.

FIG. 4 is a block diagram of the convergence association according to an embodiment of the present invention.

Referring to FIG. 4, the context $C_{41}$ 401 causes the object handle $OH_{41}$ to perform a read operation on the object $OB_{41}$, and the context $C_{42}$ 402 causes the object handle $OH_{42}$ to perform a read operation on the object $OB_{42}$.

When the output objects $OB_{41}$ and $OB_{42}$ are equal to each other ($OB_{41}=OB_{42}$), the contexts $C_{41}$ and $C_{42}$ are recognized as having the convergence association 400. Under the same situation, when the context $C_{41}$ 401 performs a write operation on the object $OB_{41}$ and the context $C_{42}$ performs a write operation on the object $OB_{42}$, the contexts $C_1$ and $C_2$ are also recognized as having the convergence association 400.

That is, the convergence association has a different characteristic from the execution association and the transfer association, which will be described later. As described above, the execution association defines the case where one context derives another context, that is, the case that the derived contexts cannot exist. However, the contexts can be defined as having the convergence association when more than two different contexts perform the read operation on the specific object. In other words, in the method for expressing the user's behaviors, the different contexts are defined as having the convergence association when they perform the same operation on the same object.

Figure 5:
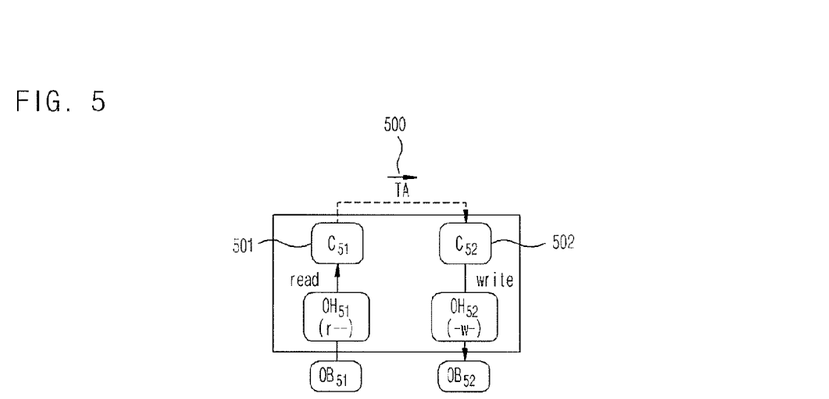
FIG. 5 is a block diagram of the transfer association according to an embodiment of the present invention.

FIG. 5 is a block diagram of the transfer association according to an embodiment of the present invention.

Referring to FIG. 5, the context $C_{51}$ 501 performs a read operation on the object $OB_{51}$ through the object handle $OH_{51}$, and the context $C_{52}$ causes the object handle $OH_{52}$ to perform a write operation on the object $OB_{52}$. At this point, the contexts $C_{51}$ and $C_{52}$ are recognized as having the transfer association when data input time and data output time of the contexts $C_{51}$ and $C_{52}$ in the read operation and the write operation are interleaved, the input/output direction are concentrated on one context direction, and input/output data sizes are all greater than zero.

When the objects $OB_{51}$ and $OB_{52}$ are equal to each other ($OB_{51}=OB_{52}$), they meet the transfer association. The aim of this method is to explicitly express the information flow between two different contexts. In order for definite tracking, a direct memory tracking method such as a taint analysis may be used, and the transfer association can be inferred by comparing the input/output time between two contexts and the input/output data size. The method of the present invention does not deal with the problem of the recognition of the information flow, but focuses on how to systematically express the user's behaviors when assuming that the occurrence of the information flow is recognized.

For example, the different contexts can be recognized as having the transfer association only if the information read in the context $C_{51}$ is used to the write operation in another context $C_{52}$. In the method for expressing the user's behaviors, the transfer association defines the case where the data input/output direction is concentrated on one context within other context with respect to different or same objects in order to express the behaviors related to the information flow by using a plurality of contexts and their associations.

Figure 6:
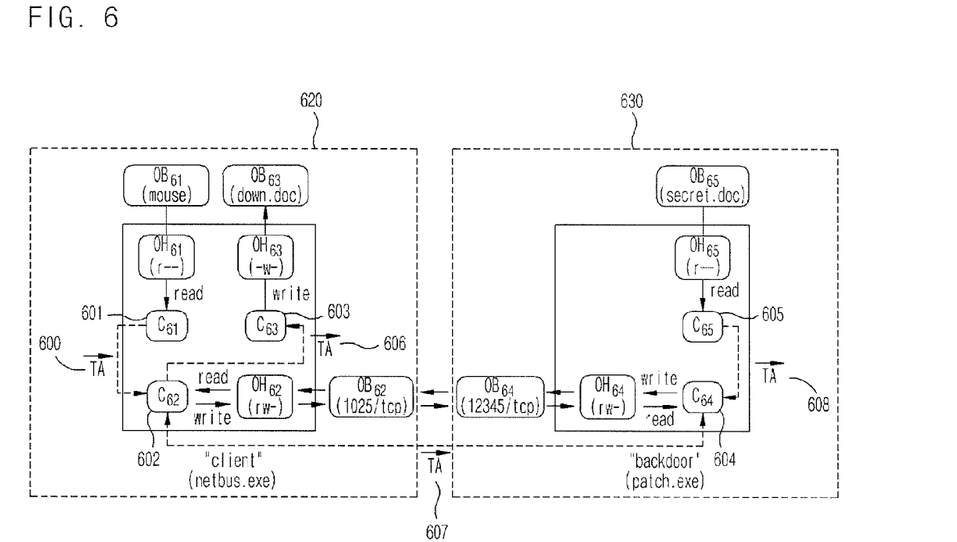
FIG. 6 is a block diagram illustrating an information leakage scenario and the method for detecting the information flow according to an embodiment of the present invention.

FIG. 6 is a block diagram illustrating an information leakage scenario and the method for detecting the information flow according to an embodiment of the present invention.

Specifically, FIG. 6 illustrates a process of expressing behaviors using the behavior modeling and detecting the information flow in a specific information leakage scenario. According to the scenario of the present invention, by using a backdoor (e.g., patch.exe) previously installed in a victim's PC 630 and a dedicated client that an attacker can connect to the backdoor in the attacker's PC 620, a dedicated client program (e.g., netbus.exe) inputs a file download command through an object $OB_{61}$ (a mouse), and leaks out an object $OB_{65}$ (a secret.doc file) located in the victim's PC 630. The object $OB_{65}$ (a secret.doc file) is downloaded on the attacker's PC 620 and saved as an object $OB_{63}$ (a down.doc file).

$C_{61}$ represents the context 601 that inputs the download command by the attacker's clicking the mouse in the backdoor dedicated client program, and $C_{62}$ represents the context 602 that is connected to the backdoor server 630 in the dedicated client program and transmits and receives the command through the network connection. $C_{63}$ represents the context $C_{63}$ that stores the downloaded file, and $C_{64}$ represents the context $C_{604}$ that is connected to the client in the backdoor server side and transmits and receives the file through the network connection. $C_{65}$ represents the context 605 that receives the file download command from the backdoor dedicated client and reads the contents of the stored file.

At this point, if the attacker uses the object handle $OH_{61}$ to read the context $C_{61}$ 601, which inputs the download command, by clicking the mouse object $OB_{61}$ in the backdoor dedicated client program (e.g., netbus.exe), the transfer association 600 occurs between the "ReadMouse" context 601 and the "ClientSocket" context 602.

When the command is transferred from the "ClientSocket" context 602 to the server through the object handle $OH_{62}$ and the server, i.e., the victim's PC 630 receives the command, the transfer association 607 occurs between the "ClientSocket" context $C_{62}$ 602 and the "ServerSocket" context $C_{64}$ 604. At this point, the object $OB_{65}$ of the victim's PC 630, i.e., secret.doc, is read by the context $C_{65}$ 605 that receives the file download command from the backdoor dedicated client and reads the contents of the designated file.

If the victim's PC 630 receives the command, reads the contents of the designated file (secret.doc), and sends it to the client, that is, the attacker's PC 620 through the reverse procedures, the transfer association 608 occurs between the "ReadFile" context 605 and the "ServerSocket" context 604, and the corresponding contents are transferred to the client and saved as down.doc.

At this point, the transfer association 606 also occurs between the "ClientSocket" context 602 and the "CreateAnddWriteFile" context 603. The object handle $OH_{63}$ is formed by the "CreateAnddWriteFile" context 603 and saves the contents of the secret.doc file ($OB_{65}$) as the down.doc file.

The behavior modeling method, the information flow recognizing method, and the information leakage detecting method according to the present invention are provided for detecting the information leakage with respect to the information objects that passed through complex steps such as money laundering, and are also very useful to simplify the behaviors of malicious codes by analyzing them as illustrated in FIG. 6 and systematically express the behaviors.

Figure 7:
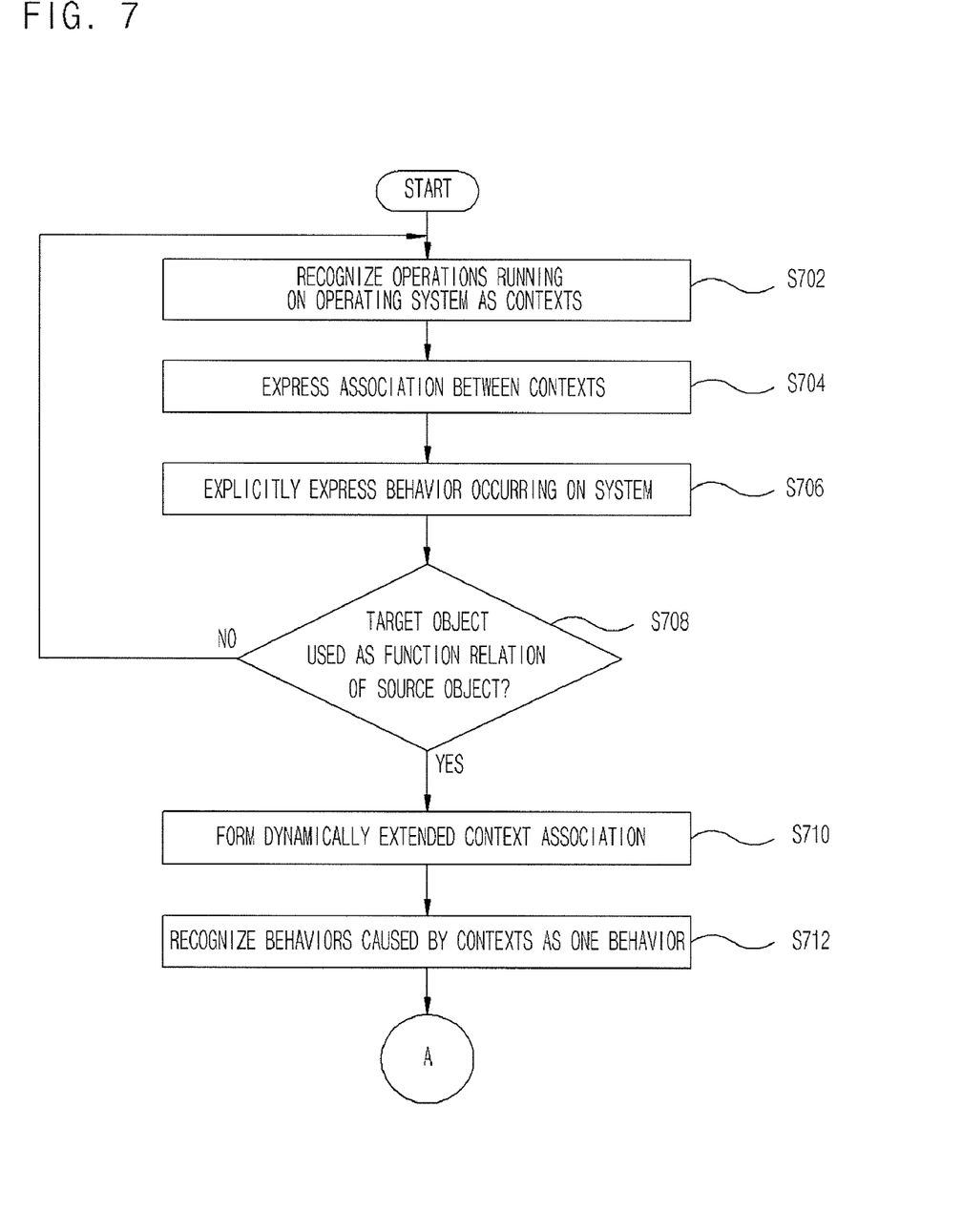
FIG. 7 is a flowchart illustrating a method for configuring the information flow chain using the analysis of user's analysis according to an embodiment of the present invention.

FIG. 7 is a flowchart illustrating a method for configuring the information flow chain using the analysis of user's analysis according to an embodiment of the present invention.

Referring to FIG. 7, the operations running on the operating system are recognized using the contexts defined as a set of the object handle (OH), the related API function list, and the situation information in step S702.

In step S704, associations between a plurality of contexts $C_1$, $C_2$ and $C_3$ are defined in the context association layer 105. All possible associations between the contexts $C_1$, $C_2$ and $C_3$ are expressed in the context association layer 105.

Using the contexts $C_1$, $C_2$ and $C_3$ and their associations, the user's behaviors occurring on the system can be explicitly expressed in the behavior layer 106. For example, if recognizing the fact that the information read in the context $C_1$ ("ReadFile") flows to another place through the context $C_2$ ("WriteFile"), the contexts $C_1$ and $C_2$ can be recognized as having a predetermined association in the information flow.

In step S706, the behaviors occurring on the system are explicitly expressed using the associations between the contexts $C_1$, $C_2$ and $C_3$.

For example, referring to FIG. 1, when assuming that $C_1$ is the behavior for the secret.doc document and $C_2$ is the behavior for the temp.txt document, the user can use the behavior abbreviation words of the contexts $C_1$ and $C_2$ to read the contents of the current secret.doc document ("The user is Copying files") and saves it as the temp.txt document, and again sends it through the network. The term "explicit" means that the user's behaviors occurring within the system are monitored and expressed with explicit words the persons can understand.

In step S708, the associations between the contexts expressed with the explicit behavior in step S706 determine if the target object is used as the source object of other behavior.

In step S710, when the target object is used as the source object of other behavior, the dynamically extended context association is generated in the extended context association layer 107.

In step S712, behaviors caused by a plurality of contexts is recognized as one behavior by using the dynamically extended context association in step s710. As described with reference to FIG. 7, the event (i.e., the call of the API function with respect to the specific object) occurring on the system can express the user's behaviors abstracted through the associations between the contexts. The expressed results are maintained as the information flow chain.

Figure 8:
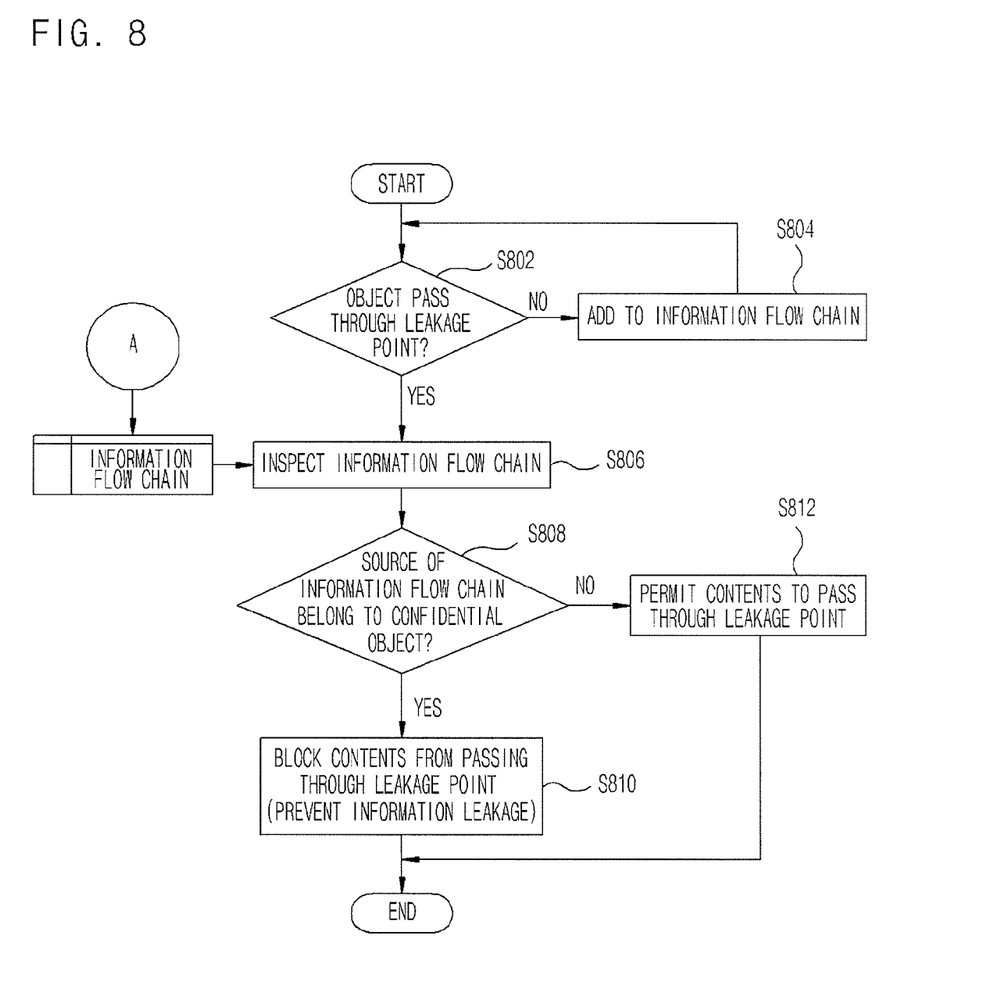
FIG. 8 is a flowchart illustrating the process of detecting the information leakage using the analysis of user's behaviors.

FIG. 8 is a flowchart illustrating the process of detecting the information leakage using the analysis of user's behaviors.

Referring to FIG. 8, the information recognized as one behavior obtained in step S712 is defined by the association between the contexts $C_{11}$, $C_{12}$, ..., $C_{21}$, as described above. The association of the contexts $C_{11}$, $C_{12}$, ..., $C_{21}$ forms one information flow chain 201. The information flow chain 201 is divided into a source and a destination.

In step S802, it is determined if the corresponding object passes through the leakage point by using the information recognized as one behavior in step S712.

In step S804, when it is determined in step S802 that the corresponding object does not pass through the leakage point, the context related to the corresponding object is added to the information flow chain. Then, the process returns to step S802 to determine if the corresponding object and the related context pass through the leakage point. The addition to the information flow chain means the execution of the process indicated in FIG. 7.

In step S806, when it is determined in step S802 that the corresponding object passes through the leakage point, the information flow chain 201 connected to the corresponding object is tested.

In step S808, it is determined, using the test result of step S806, if the source of the information flow chain 201 belongs to the confidential object 200.

In step S810, when it is determined in step S808 that the source of the information flow chain 201 belongs to the confidential object 200, the information leakage is prevented by blocking the contents from passing through leakage point 202.

In step S812, when it is determined in step S808 that the source of the information flow chain does not belong to the confidential object 200, the passing of the leakage point is permitted.

The conventional technologies and solutions for preventing the information leakage do not consider the information flow sufficiently. Thus, when confidential documents pass through complex and various passage routes by malicious insiders, there is a limitation in tracking the original document and tracking the passage routes at the final time point of information leakage. Consequently, the information leakage may not be detected. In practice, the conventional solutions use a method for encrypting the target object in order for blocking the attack. However, the encryption itself depends on the user's determination, and the contents may leak out by the information flow. Therefore, there is a need for a method for systematically expressing the information flow and modeling user's behaviors.

The information flow recognizing method according to the present invention can track the original document and passage routes with respect to even the confidential document passing through complex passage routes, thereby detecting the information leakage.

Furthermore, the context-based behavior expressing method according to the present invention can exactly and systematically express the user's behaviors, and can explicitly express the function call information occurring on the system as the user's behaviors in the automatic manner.

Moreover, the context-based behavior expressing method according to the present invention can recognize the information on the API function list, which is not yet called with respect to the specific object handle, according to the definition of the contexts. Therefore, the API functions to be called in the future can be known, and the user's behaviors can be predicted.

The information flow recognizing method according to the present invention can

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A computer implemented method for recognizing information flow and detecting information leakage, the method comprising:
   recognizing by a micro-processor operations running on an operating system as contexts defined as a set of object handle, related API function list, and situation information;
   expressing possible associations between the contexts;
   explicitly expressing the expressed associations between the contexts as user's behaviors occurring on a system;
   determining if a target object with respect to a behavior is used as a function of a source object of another behavior in the explicitly expressed associations between the contexts;
   recognizing the behavior as one behavior corresponding to a dynamically extended context association when the target object is used as the function of the source object of another behavior;
   inspecting the one behavior and determining if the object passes through a leakage point;
   adding contexts related to the object to an information flow chain when it is determined that the object does not pass through the leakage point;
   inspecting the information flow chain linked to the object when it is determined that the object passes through the leakage point;
   determining if a source of the information flow chain configured with the contexts belongs to a confidential object by using the inspection result;
   blocking the contexts from passing through the leakage point when it is determined that the source of the information flow chain belongs to the confidential object; and
   permitting the contexts to pass through the leakage point when it is determined that the source of the information flow chain does not belong to the confidential object.

2. The computer implemented method of claim 1, wherein, in the recognizing step, the operations occurring on the operating system are expressed as a context layer that expresses the contexts, and the operations are defined by an object layer, an object handle layer, and an operation layer, which are located under the context layer.

3. The computer implemented method of claim 2, wherein the associations between the contexts are defined in a context association layer.

4. The computer implemented method of claim 2, wherein context instance generated in contexts defined in the context layer is expressed in a context instance layer.

5. The computer implemented method of claim 1, wherein the behavior expressing step explicitly expresses the user's behaviors in a behavior layer that expresses behaviors inferred in the context layer.

6. The computer implemented method of claim 5, wherein the recognizing step generates the context association, which is dynamically expressed in an extended context association layer located above the behavior layer, with respect to the user's behaviors expressed in the behavior layer, and recognizes the user's behaviors as one behavior in an extended behavior layer located above the extended context association layer.

7. The computer implemented method of claim 3, wherein the association defined in the context association layer is defined centering on an association related to the information flow, and is a behavior model related to the information flow recognition for detecting the information leakage.

8. The computer implemented method of claim 1, wherein the confidential object and the leakage point are previously defined according to characteristics of an applied domain.

9. A computer implemented method for recognizing information flow and detecting information leakage, the method comprising:
   recognizing by a micro-processor operations running on an operating system as contexts defined as a set of object handle, related API function list, and situation information;
   expressing possible associations between the contexts;
   explicitly expressing the expressed associations between the contexts as user's behaviors occurring on a system;
   determining if a target object with respect to a behavior is used as a function of a source object of another behavior in the explicitly expressed associations between the contexts;
   recognizing the behavior as one behavior corresponding to a dynamically extended context association when the target object is used as the function of the source object of another behavior,
   wherein the possible associations between the contexts in the expressing step comprises:
   an execution association where, in the method for expressing the user's behaviors, two contexts are defined as having the execution association when one executable object generated by one context generates another context in order to express the behavior related to the information flow by using a plurality of contexts and associations thereof;
   a convergence association where, in the method for expressing the user's behaviors, different contexts are defined as having the convergence association when the different contexts perform the same operation on the same object; and
   a transfer association where, in the method for expressing the user's behaviors, contexts are defined as having the transfer association when data input/output direction is concentrated on one context within other context with respect to different or same objects in order to express the behaviors related to the information flow by using a plurality of contexts and associations thereof.

10. The computer implemented method of claim 9, wherein, in the recognizing step, the operations occurring on the operating system are expressed as a context layer that expresses the contexts, and the operations are defined by an object layer, an object handle layer, and an operation layer, which are located under the context layer.

11. The computer implemented method of claim 10, wherein the associations between the contexts are defined in a context association layer.

12. The computer implemented method of claim 10, wherein context instance generated in contexts defined in the context layer is expressed in a context instance layer.

13. The computer implemented method of claim 9, wherein the behavior expressing step explicitly expresses the user's behaviors in a behavior layer that expresses behaviors inferred in the context layer.

14. The computer implemented method of claim 13, wherein the recognizing step generates the context association, which is dynamically expressed in an extended context association layer located above the behavior layer, with respect to the user's behaviors expressed in the behavior layer, and recognizes the user's behaviors as one behavior in an extended behavior layer located above the extended context association layer.

15. The computer implemented method of claim 11, wherein the association defined in the context association layer is defined centering on an association related to the information flow, and is a behavior model related to the information flow recognition for detecting the information leakage.

16. A computer implemented method of blocking information leakage on a computer system based on a user's behavior, the method comprising the steps of:
recognizing by a micro-processor a first action of the user based on a source object, API function, and situation information of the first action;
recognizing a second action of the user based on a target object, API function, and situation information of the second action;
determining whether the first action and second action are related based on whether the source object and target object are the same or similar;
recognizing the first action and second action as a user's behavior;
inspecting the user's behavior and determining if the object passes through a leakage point;
adding contexts related to the object to an information flow chain when it is determined that the object does not pass through the leakage point;
inspecting the information flow chain linked to the object when it is determined that the object passes through the leakage point;
determining if a source of the information flow chain configured with the contexts belongs to a confidential object by using the inspection result;
blocking the contexts from passing through the leakage point when it is determined that the source of the information flow chain belongs to the confidential object; and
permitting the contexts to pass through the leakage point when it is determined that the source of the information flow chain does not belong to the confidential object.

17. The computer implemented method of claim 16, wherein the first action of the user is a read function and the second action of the user is a write function.

18. The computer implemented method of claim 17, wherein the target object is a copy, created by the user, of the source object.

19. The computer implemented method of claim 16, wherein the step of determining whether information leakage will occur further comprises recognizing a user executing a transfer function of the target object and blocking that transfer if the destination location would allow information leakage.

20. The computer implemented method of claim 19, wherein the destination location is any one of a USB port, network port, or transferable storage medium.

* * * * *